(12) United States Patent
Selina et al.

(10) Patent No.: US 8,544,677 B2
(45) Date of Patent: Oct. 1, 2013

(54) ONE-PIECE LOCK-BACK LID

(75) Inventors: John R. Selina, Brighton, MI (US); Randall J. Corbett, Macomb, MI (US)

(73) Assignee: Letica Corporation, Rochester, MI (US)

( * ) Notice: Subject to any disclaimer, the term of this patent is extended or adjusted under 35 U.S.C. 154(b) by 168 days.

(21) Appl. No.: 13/208,752

(22) Filed: Aug. 12, 2011

(65) Prior Publication Data

US 2013/0037558 A1  Feb. 14, 2013

(51) Int. Cl.
*A47G 19/22* (2006.01)

(52) U.S. Cl.
USPC ...... 220/713; 220/254.3; 229/404; 229/906.1

(58) Field of Classification Search
USPC .......... 220/254.3, 254.5, 713, 712; 229/404, 229/906.1
See application file for complete search history.

(56) References Cited

U.S. PATENT DOCUMENTS

| 4,202,459 | A |   | 5/1980  | DeParales et al. |        |
|-----------|---|---|---------|------------------|--------|
| 4,629,088 | A | * | 12/1986 | Durgin           | 220/254.3 |
| 4,738,373 | A |   | 4/1988  | DeParales        |        |
| 4,949,865 | A | * | 8/1990  | Turner           | 220/713 |
| 5,613,619 | A |   | 3/1997  | Van Melle        |        |
| 5,839,601 | A |   | 11/1998 | Van Melle        |        |
| 6,089,397 | A |   | 7/2000  | Van Melle        |        |
| 6,419,112 | B1 | * | 7/2002  | Bruce et al.    | 220/781 |
| 6,612,456 | B1 |   | 9/2003  | Hundley et al.  |        |
| 6,889,859 | B1 |   | 5/2005  | Leon             |        |
| 6,889,860 | B2 |   | 5/2005  | Mazzarolo        |        |
| 2004/0118847 | A1 | * | 6/2004 | Giraud         | 220/254.3 |
| 2006/0255037 | A1 | * | 11/2006 | Hollis et al.  | 220/254.3 |

FOREIGN PATENT DOCUMENTS

| EP | 0849187 A2 | 6/1998 |
| EP | 1321374 A2 | 6/2003 |
| WO | 02/30783 A1 | 4/2002 |

* cited by examiner

*Primary Examiner* — Anthony Stashick
*Assistant Examiner* — James N Smalley
(74) *Attorney, Agent, or Firm* — Young Basile Hanlon & MacFarlane, PC

(57) ABSTRACT

A drink-through plastic lid is injection molded in one piece to define a rim structure which snaps onto the rim of a cup and an asymmetric crown having a drink-through opening formed at the high point of an outer deck. An integral hinged flap with a C-shaped seal lip on the inside surface can lock by means of said lip into the drink-through opening when in one condition. The flexible outer edges of the flap latch into a lock-back recess which interrupts an intermediate inner deck formed between the outer crown deck and the floor of a well in the interior area of the lid.

4 Claims, 4 Drawing Sheets

ONE-PIECE LOCK-BACK LID

FIELD OF THE INVENTION

The invention relates to drink-through plastic lids of the type used in combination with disposable drink cups.

BACKGROUND OF THE INVENTION

It is known to provide a drink-through feature in a disposable cup lid. A drink-through feature can be implemented in a variety of ways ranging from a small aperture which is always open to a two-part lid structure wherein a snap-on seal strip can be hingedly attached to the top of the lid where it can be moved into a position to plug the drink-through opening or locked back to leave it open. Between these two ends of the spectrum are numerous lids with fold-back lock-back flaps which cover the opening in one position and lock back into a recess in another position; see, as examples, U.S. Pat. No. 6,612,456 to Hundley et al., U.S. Pat. No. 6,089,397 to Van Melle and U.S. Pat. No. 4,202,459 to Parales et al.

Such lids are typically thermoformed in an extruded sheet of heated soft plastic material which is drawn by vacuum over one or more dies which define the desired topographical features of the lid. Such thermoforming methods produce a substantial web of scrap along with usable lids. Releasing the lids from the web also requires a die cutting step.

SUMMARY OF THE INVENTION

The present invention provides a drink-through plastic lid which overcomes a number of disadvantages to the prior art. It provides a one-piece structure with an integral hinged flap which effectively seals the drink-through opening when in one position and effectively latches back to provide the drink-through function when in another position. In addition, the structural areas of the flap which are used to latch the flap into the lock-back position are different from a structural feature which is used to seal the opening, thus allowing the lid to be cycled through at least several open/close operations during a term of use.

A further feature of the invention is that it can be advantageously manufactured by injection molding rather than thermoforming and, as a result, can eliminate the large scrap ratio associated with thermoforming in addition to providing an attractive smooth glossy finish on the surface of the lid which results from the injection molding process.

In a preferred embodiment hereinafter described in detail, the drink-through plastic lid of the present invention incorporates an integral structure defining a generally circular rim adapted to snugly snap on to the rim of a cup, a raised crown defining a generally annular deck within the rim and above the plane of the rim structure, a well within the crown having a floor below the plane of the annular deck, and a drink-through opening formed in the deck, preferably at a high point in the deck where an asymmetric design is used. A thin flexible flap is integrally hinged to the crown immediately adjacent the opening and pivotal between closed/sealed and latched back positions. A lip on the inner surface of the flap conforms to and coacts with the inside edge of the opening to latch the flap in the opening and seal the opening when the flap is pressed toward the opening. When folded back, the flap moves into a recess contiguous with the well and having opposite side walls which are shaped and spaced apart to latchingly receive an edge of the flap and hold it in a position where it is substantially within the well.

The well may have a floor which slopes toward the drink-through opening and the fold-back latch-back recess within the well not only to provide clearance for the user but also to provide a sump to catch and hold overflow.

In the preferred form, the lid is nestable for shipment and accommodates the stacking of tapered cups one atop the other with the lid in place.

Other advantages, features and characteristics of the present invention, as well as methods of operation and functions of the related elements of the structure, and the combination of parts and economies of manufacture, will become more apparent upon consideration of the following detailed description and the appended claims with reference to the accompanying photographs, the latter being briefly described hereinafter.

BRIEF SUMMARY OF THE DRAWINGS

The description herein makes reference to the accompanying drawings wherein like reference numerals refer to like parts throughout the several views and wherein.

DETAILED DESCRIPTION OF THE ILLUSTRATIVE EMBODIMENT

Figure 1:
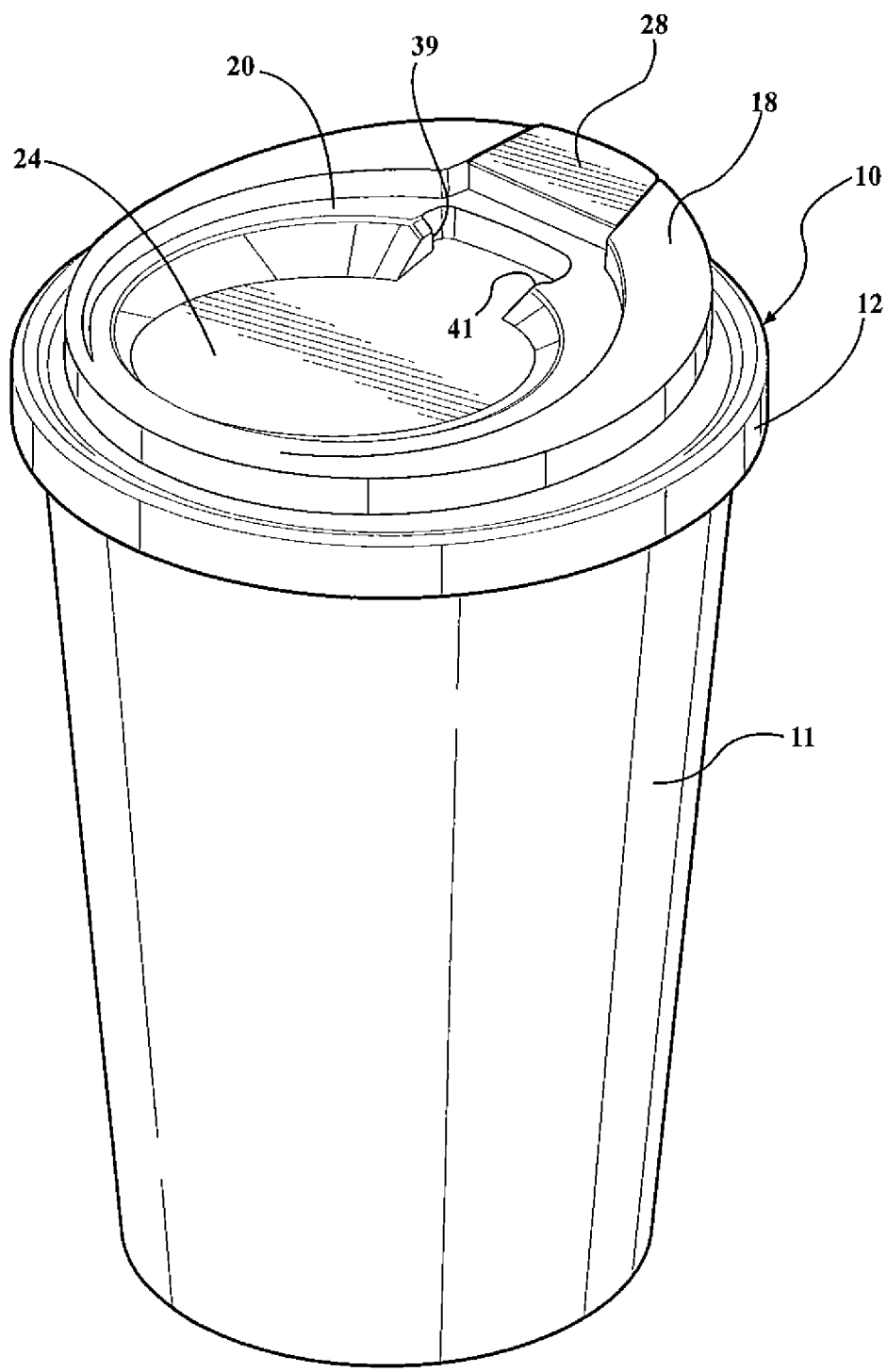
FIG. 1 is a perspective view of a hot cup with a lid embodying the invention installed thereon.
Figure 2:
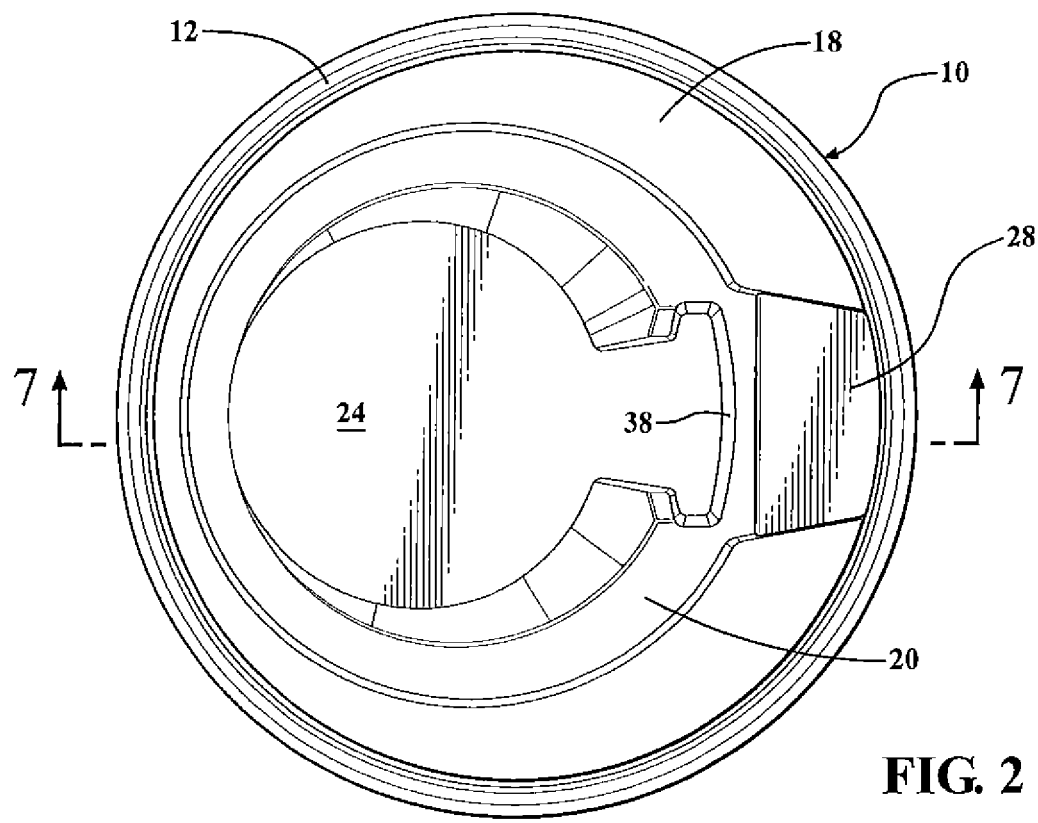
FIG. 2 is a top view of the lid of FIG. 1.
Figure 3:
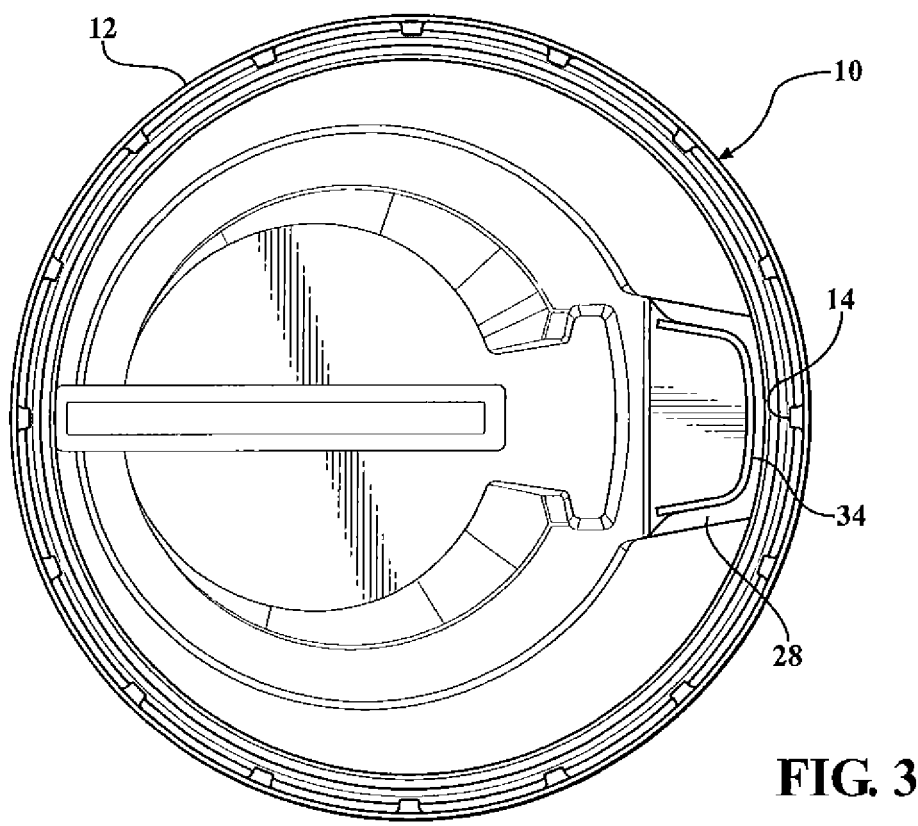
FIG. 3 is a bottom view of the lid with the seal flap closed.
Figure 4:
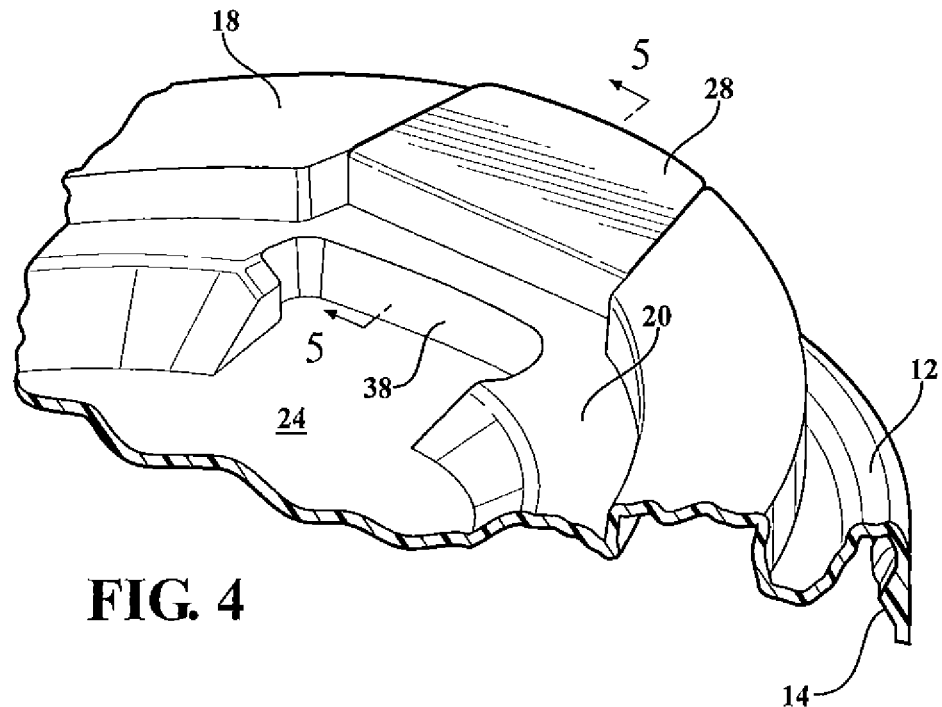
FIG. 4 is a perspective view of the well detail with the seal flap closed.

Referring to the figures, there is shown a drink-through plastic lid 10 for a disposable drink cup 11 of the type generally dispensed by fast food restaurants, cafeterias and other institutional eating places. The lid 10 comprises an annular outer rim structure 12 which is adapted to snugly snap on to the rim of the cup. The snap-on feature is provided by segmented ribs 14 which extend around the inside surface of the rim structure 12 and define an inverted U-shaped channel 16 in which the rim of the cup extends. This particular design is adapted to work best with paper cups having rolled upper edges.

The lid 10 further comprises the integral combination of a raised outer deck 18 which is radially spaced inwardly from the rim structure 12 and which defines a crown within the rim structure 12 and substantially above it; i.e., in this design, the crowned deck may stand approximately ⅝" above the top surface of the rim structure 12.

Formed within the crowned upper deck 18 is a well 24 having a sloped floor. In the illustrated embodiment, the well is stepped to define a generally annular intermediate deck 20 for cup stacking purposes which has an inwardly sloping inner wall 21. The inner deck tends to blend with the outer deck 18 toward the left side of the lid as shown in FIG. 1 because of the sloped elevation of the plane of the upper deck 18. A gap in the intermediate deck 20 forms a latch recess having opposed side walls 39, 41 for purposes to be described.

A drink-through opening 26 having a shaped outline is formed in the highpoint of the crowned outer deck 18 and is approximately 1" wide and about ⅝" in radial depth. A flap 28 is connected to the inside edge of the upper deck 18 immediately adjacent the drink-through opening 26 by means of a living hinge 30. The outside edge of the flap 28 is larger than the inside edge dimensions of the drink-through opening 26 so as to overlie the opening by about 2 mm for reasons to be described. Within the edge 36 of the flap 28 and on the surface of the flap 28 which folds toward the opening 26 is a C-shaped lip 34 of resilient plastic material which conforms to the outline of the opening 26 to latch into and seal the opening when the flap 20 is pushed downwardly into a seat just below the plane of the deck 18.

Figure 5:
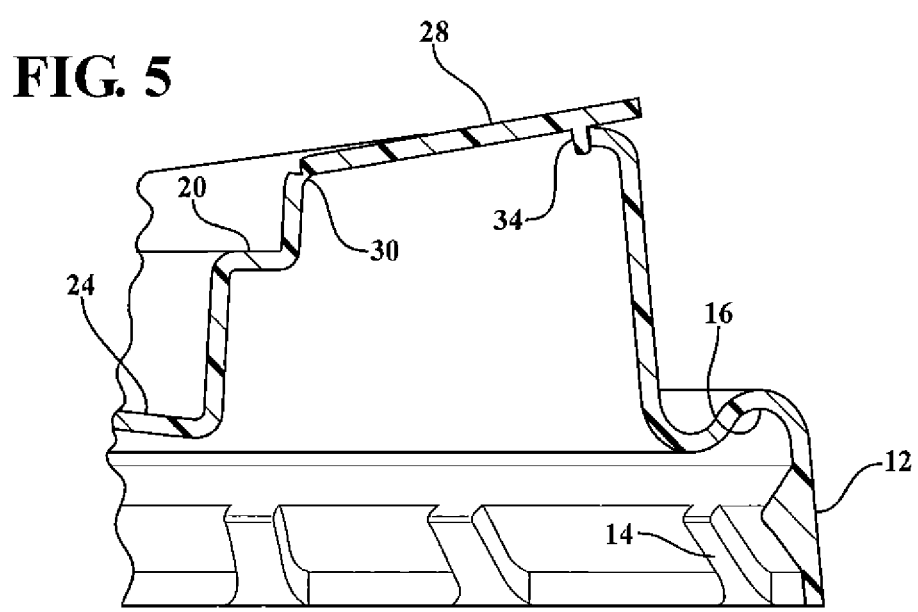
FIG. 5 is a sectional view through the real flap and the crown deck of the lid.

The C-shaped lip 34 is spaced inwardly from the outside edge 36 of the flap 26 by about 2 mm to define a flexible outer edge 32 of the flap 28 having corners which latchingly snap into contact with the opposing walls 39, 41 of the latch recess 38 when the flap 28 is folded back to the lock-back drink-through condition shown in FIG. 5.

The lid 10 is preferably made by injection molding of suitable material such as polypropylene, polyethylene, and PET. The die from which the lid 10 is made is designed so that the flap 28 is molded in a stand-up position; i.e., at 90° to the plane of the upper deck 18.

Figure 6:
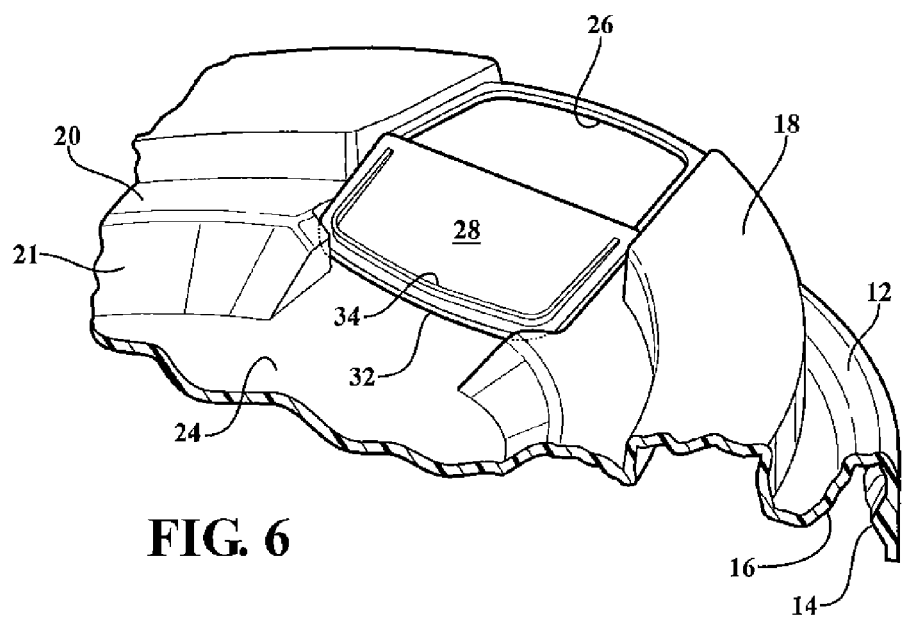
FIG. 6 is a perspective view of the well detail with the seal flap open and latched back.

FIG. 6 shows the lid with the flap 28 folded back and "locked" back by means of the interaction between the outer edges 36 of the flap and the inner surfaces of the recess 38. This provides the user access to the contents of a cup to which the lid may be attached.

Figure 7:
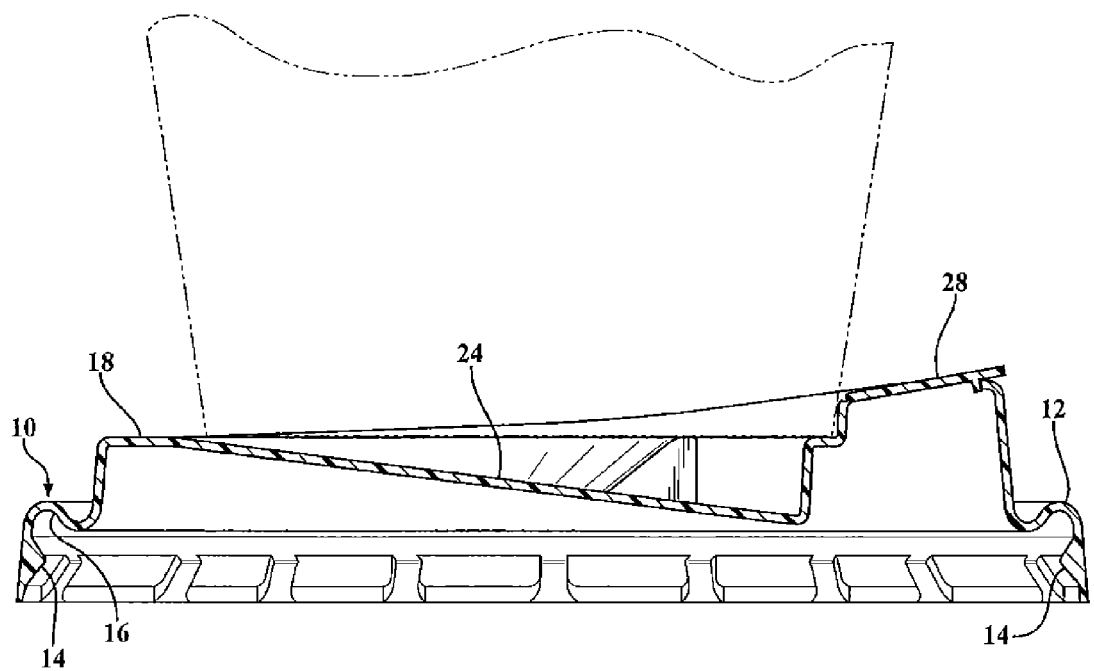
FIG. 7 is a sectional view of a lid showing how a cup can be stacked on top of it.

FIG. 7 shows a lid 10 in side view, cross-section wherein the intermediate deck 20 provides a level annular surface for receiving the bottom of a cup (shown in phantom line) sitting on top of the lid 10. This is the stacking feature mentioned otherwise herein.

In use, the lid is applied to the top rim of a filled cup and the flap 28 is folded forwardly and downwardly into the opening 26 to seal the opening by coaction between the C-shaped lip 34 and the outside edge of the opening 26. When the user desires to drink from the cup, the flap is flipped upwardly and rotated backwardly into the recess 38 which forms a gap in the inner deck 20 so that the flexible outer edges and particularly the outer edges 36 of the flap 28 latch to the opposing upstanding side walls of the lock-back recess 38. A cup may be stacked on top of the deck 20 as shown in FIG. 7. It will be understood that the shape of the flap 28 as shown in the drawings is illustrative only and that the other shapes including those with less well-defined corners may be used.

The lid is preferably manufactured by preparing a metal die, typically in two parts, having an injection inlet for fluid plastic. The die is configured to place the flap 28 in an upright orientation relative to the horizontal plane of the lid; i.e., a plane parallel to the top of a cup to which the lid may be applied.

What is claimed is:

1. A drink-through plastic lid for drink cups comprising:
   a circular rim adapted to fit onto the rim of a cup;
   a raised crown defining a generally annular deck above said rim and radially spaced inwardly therefrom;
   a drink-through opening formed in said deck;
   a thin flexible flap having an integral hinge connecting said flap to said crown immediately inwardly adjacent said opening whereby the flap is pivotable toward the center of the lid to open and close said opening; said flap having side edges
   a seal lip formed on a surface of said flap to coact with part of the inside edge of said opening to latch the flap in the opening and seal the opening when latched; and
   a latch-back recess formed in said lid having opposing side surfaces, said side surfaces being shaped and spaced apart to latchingly receive the side edges of said flap in a folded-back position and latch said flap in said folded-back position wherein the flap is positioned substantially into said well; said lid further including a well within said crown and having a floor below the plane of said deck; wherein the well is stepped to define a generally annular intermediate deck above said floor but having at least a portion which is below the level of said annular deck, said latch recess forming a gap in said intermediate deck.

2. A lid as defined in claim 1 wherein the floor of said well slopes downwardly from a point contiguous with said deck to and into said latch recess.

3. A lid as defined in claim 1 wherein the material of construction is selected from the group consisting of polyethylene, polypropylene and PET.

4. A drink-through lid as defined in claim 1 wherein the flap has an outer edge essentially flush with the outer surface of the annular crown deck and location of the hinge and the radial length of said flap are such that the flap, when fully folded back, extend inwardly less than about one-half of the diameter of said lid.

\* \* \* \* \*